Patented Apr. 27, 1954

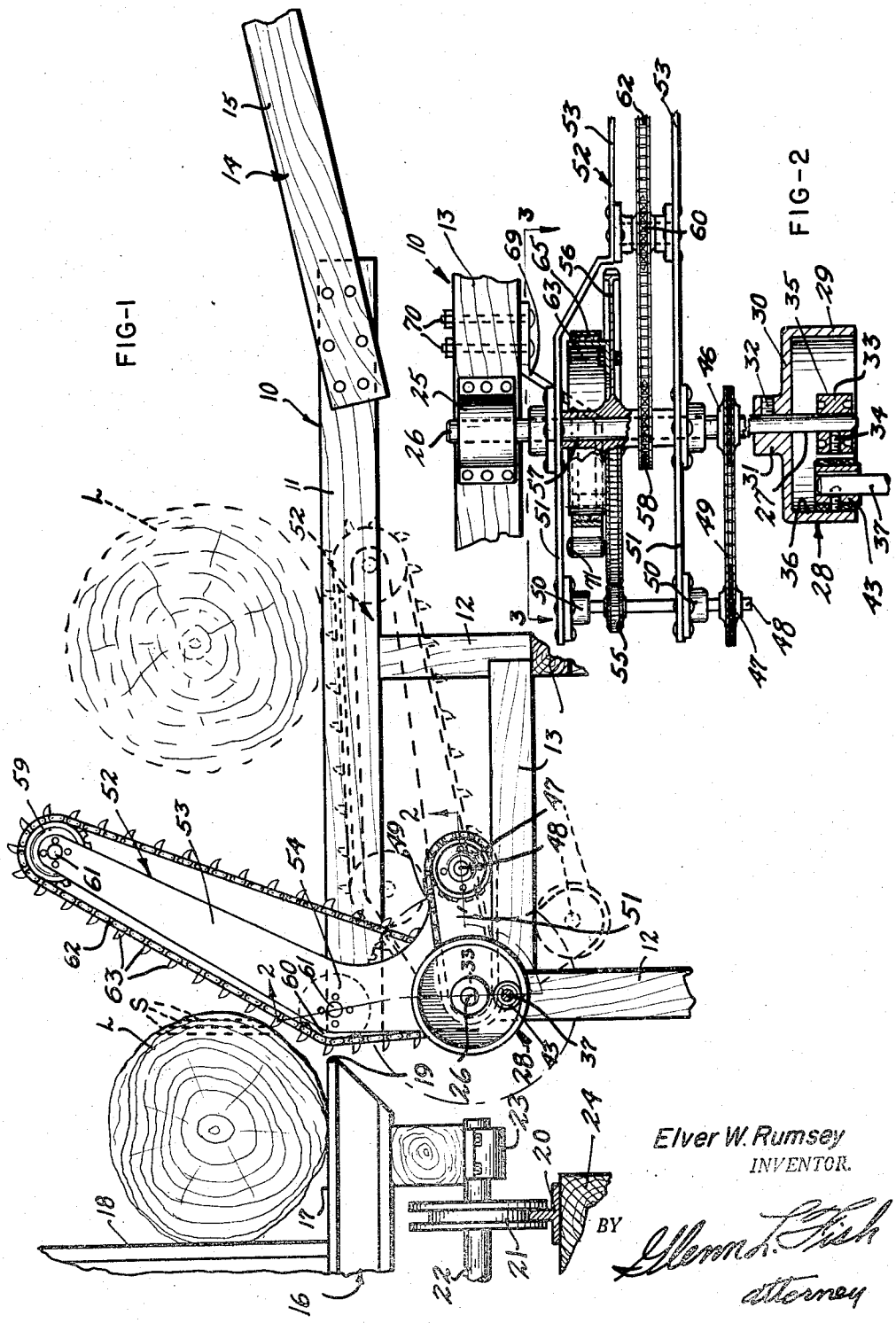

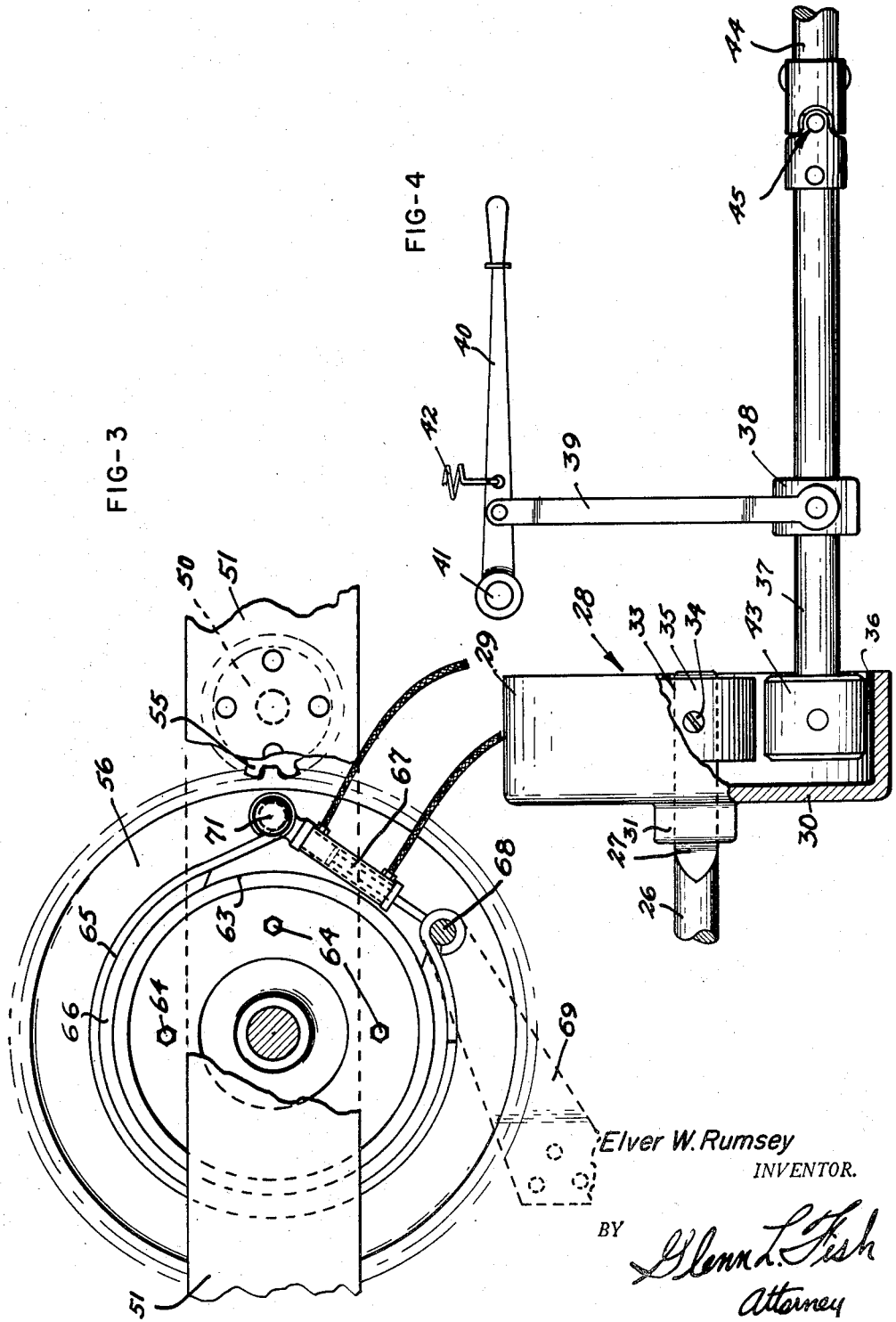

2,676,626

UNITED STATES PATENT OFFICE 2,676,626

LOG LOADING AND TURNING DEVICE

Elver W. Rumsey, Malo, Wash.

Application November 22, 1952, Serial No. 322,107

1 Claim. (Cl. 143—102)

My present invention relates to sawmill equipment and more particularly to a device for loading and turning logs on a saw carriage.

One object of the invention lies in the provision of a log loader and turner which has a tiltable beam movable from a lowered horizontal position to a raised vertical position and which has a travelling endless toothed chain adapted to move a log onto a saw carriage and to turn the log as desired on the saw carriage.

Another object of the invention lies in the provision of a log loader and turner which will greatly reduce the time and labor necessary for handling logs while loading them upon a saw carriage and turning them.

Another object of the invention lies in the provision of an unique reversing clutch-transmission.

Another object of the invention lies in the provision of a log loader and turner having an angular tiltable beam shaped to dispose the teeth carried by a travelling endless chain in a position to contact the log on an outside surface, whereby the sawed face is not mutilated by the travelling teeth.

Another object of the invention lies in the provision of a braking control which cooperates with other mechanical rotating parts for tilting the beam and permitting raising and lowering of the beam while the chain is travelling in one direction.

These and other objects of the invention will become apparent during the course of the following description.

In the accompanying drawings, forming a part of this specification, and in which like numerals are employed to designate like parts, Figure 1 is a side elevation of the log turner and indicating a portion of the saw carriage and supporting frame;

Figure 2 is a fragmentary enlarged plan of the improved log loader and turner with parts shown in horizontal cross section taken as at line 2—2 of Figure 1;

Figure 3 is a fragmentary enlarged view as at line 3—3 of Figure 2; and

Figure 4 is a fragmentary elevation partially in cross section and showing an improved reversing clutch-transmission and operating mechanism therefor.

Referring now more particularly to the drawing, in Figure 1 I have shown a frame 10 which consists of the usual horizontal timbers 11 supported on upright shoring 12 and braces 13. A ramp 14 formed of inclined timbers 15 is provided, down which logs L are rolled onto the frame 10 and the logs are usually manually rolled onto the saw carriage 16 by means of cant hooks, where they rest upon the platform 17 and against knees 18 movable transversely of the carriage toward and away from the receiving edge 19 of the platform 17. A suitable track 20 cooperates with grooved wheels 21 carried by an axle 22 bearing at 23 to support the carriage on a portion 24 of the frame 10.

A pair of spaced bearings 25, one of which is shown in Figure 2, are secured as by bolts to selected pairs of braces 13 and a driven shaft 26 is rotatably supported in bearings 25 in a horizontal position parallel with the movement of carriage 16. One end of the driven shaft 26 is provided with a flattened face 27 (Fig. 4) which receives and circumferentially secures a reversing clutch-transmission unit 28 which comprises an annular sleeve 29 carried by a disc-shaped wall 30 having a boss 31 united with the shaft 26 and secured against longitudinal movement thereon by a set bolt 32 (Fig. 2).

Concentric with the sleeve 29 and spaced inwardly therefrom, I have provided a friction wheel 33 secured against circumferential rotation relative to the shaft by means of the face 27 and against longitudinal movement relative thereto by means of set bolt 34. The wheel has an annular friction face 35 and is disposed within the sleeve 29 in spaced relation to its internal face 36. Intermediate the internal face 36 of the sleeve 29 and the external face 35 of friction wheel 33, I have provided a second friction wheel 43 secured in like manner to an axially offset shaft 37 which is rotatably carried in a floating bearing 38 supported by a link 39 pivotally united to a lever 40, which has its inner end pivotally carried by a portion of the frame as at 41. An expansion spring 42 supports the hand lever 40 in such position that the friction wheel 43 is disposed midway the faces 35 and 36 out of engagement therewith.

Rotary power is received from a source not shown through shaft 44 which is united with floating shaft 37 by means of a universal joint 45. When it is desired to rotate shaft 26 in a counterclockwise direction, the motion received from shaft 44 is counterclockwise and is transmitted to the inner face 36 by applying downward pressure to the hand lever 40 and engaging friction wheel 43 with the face 36. Releasing the hand lever 40 will permit the wheel 43 to seek its normal position intermediate the faces 35 and 36 and upward pressure on hand lever 40 will frictionally engage wheel 43 with the face 35 of friction wheel 33 and impart clockwise rotation to the driven shaft 26.

The second supporting beam 13 is omitted from the view shown in Figure 2. However, it will be understood that the beam passes between the clutch-transmission unit 28 and a sprocket 46 and is rotatably carried in a bearing as 25. The sprocket 46 is aligned with a second sprocket 47 fixedly carried on a countershaft 48 and united by a sprocket chain 49; therefore, counterclockwise rotation of shaft 26 will impart counterclockwise rotation to countershaft 48. The countershaft 48 is rotatably carried in spaced bearings 50 which are secured to the inner end portions 51 of a tiltable beam indicated in general by the numeral 52. As shown in Figure 2, the beam comprises spaced bars 53. Inspection of Figure 1 will indicate that the beam 52 when viewed in side elevation is somewhat L-shaped; however, the element corresponding to the upright of the L is provided with an obtuse longitudinal angle as at 54, the angle corresponding to the horizontal level of the platform 17 on carriage 16 when the beam is disposed in its raised substantially vertical position.

A pinion gear 55 is fixed to countershaft 48 and meshes with an enlarged spur gear 56 which has a central bearing sleeve 57 rotatably carried by shaft 26. Fixed about the sleeve 57 is a chain sprocket 58, and in alignment with the plane of sprocket 58 the beam 52 is provided with a sprocket 59 at its outer end and a sprocket 60 disposed at the angle 54. The sprockets 59 and 60 are carried on pins 61 which are secured to the bars 53 of beam 52, thereby scaping the bars and securing them in proper relation. An endless chain 62 is trained about the sprockets 58, 59 and 60 and the chain is provided with a succession of teeth 63 disposed outwardly as the chain traverses the sprocket 59. Thus it will be seen that counterclockwise rotation of countershaft 48 through its pinion gear 55 will impart clockwise rotation to enlarged gear 56 and its sleeve 57, thereby causing chain 62 to travel from the sprocket 58 upwardly over sprocket 60 and thence sprocket 59.

To raise the beam from its lowered substantially horizontal position shown in dotted lines of Figure 1, I have provided a brake drum 63 which is secured as by bolts 64 to the spur gear 56. A brake band 65 is provided with any acceptable type of brake lining 66 (Fig. 3) and the brake band and lining loosely encircle the brake drum 63. A hydraulic cylinder 67 is anchored at one end on a pin 68 carried by a bracket 69 bolted at 70 to one of the timbers 13. One end of the brake band 65 is secured to the pin 68 and the opposed end of the brake band is secured to the opposed end of the hydraulic cylinder 67 as by pin 71. Any suitable manually operated means of controlling hydraulic cylinder 67 may be employed and, therefore, no specific means has been shown for so doing.

To tilt the beam 52 upwardly to its raised substantially vertical position, as shown in full lines of Figure 1, while the spur gear 56 is being rotated in a clockwise direction, it is only necessary to apply braking pressure to the brake drum 63 by the above described means. This resistance to the free rotation of spur gear 56 will cause pinion gear 55 to walk around spur gear 56 in a direction counterclockwise of the spur gear as viewed in Figure 1, thus causing the beam 52 to raise. It is not necessary that the spur gear 56 be stopped, but only sufficient frictional retarding must be applied to lift the weight of beam 52.

When a log L is in the position indicated by dotted lines and it is desired to move the log onto the saw carriage, braking pressure may be applied to the brake drum 63 and the beam 52 will thus be tilted upwardly and the teeth 63 of chain 62, which has an upper flight travelling in a direction to the right of Figure 1, will catch the bottom of the log L and cause the log to rotate in a counterclockwise direction as viewed in Figure 1. The braking pressure may then be instantly released and the momentum of the rotating log will cause the log to move to the left toward the saw carriage 16. This may be repeated as often as necessary to place the log on the carriage in the position shown by full line of Figure 1. The saw carriage is then shifted longitudinally along the track 20 and a vertically disposed saw will cut slabs from the side thereof as indicated by the dotted lines S. After a number of slabs have been removed, it is customary to rotate the log one-quarter turn and remove a number of slabs from the then disposed side, continuing this operation until such time as the log has been squared into a timber. As can be seen in Figure 1, the angle at 54 of beam 52 causes the teeth to grasp the log below the cuts S and thus will eliminate the mutilating of the face formed by the cutting saw, therefore reducing the amount of waste in each log being cut into timbers or boards.

In other log turning devices of this type that I am acquainted with, they do not have the angle at 54 and, therefore, the beam 52 would extend vertically and the teeth 63 would mutilate the complete side of the log at the point where the beam 52 is raised and use to turn the log. Further, the other art uses a constant brake system making it necessary to reverse the rotation of the parts to lower the beam. This makes it nearly impossible to cant a log onto the carriage with the log turning device. However, the only time the reversing mechanism is necessary in my present invention is in the event that the teeth 63 become lodged in the log L. It may then be necessary to reverse the rotation or movement of chain 62 to dislodge the teeth.

Having thus described my invention, I claim:

A log loader and turner comprising a supporting frame disposed at the receiving edge of a reciprocating saw carriage, a horizontal driven shaft rotatably supported on said frame and parallel with the movement of said carriage, a reversing clutch-transmission unit for imparting selective directional rotation from a source of rotary motion to said shaft, a beam pivotally carried by said shaft and movable from a lowered horizontal position to a raised substantially vertical position, a countershaft pivotally carried by said beam in spaced parallel relation to said shaft, means associating the shaft and countershaft for simultaneous rotary motion, a pinion gear fixed on said countershaft, a spur gear meshing with said pinion and having an axial sleeve rotatably bearinged on said shaft, a chain sprocket fixed on said sleeve, said beam having an obtuse longitudinal angle intermediate its length at a point corresponding to the platform of said carriage when the beam is in the raised position, sprockets rotatably carried by the beam at its free end and at said angle, an endless toothed chain trained about said sprockets, a brake drum secured to said spur gear, and a selectively operable pressure brake band supported by said frame and engageable with said brake drum for raising and lowering said beam.

References Cited in the file of this patent

UNITED STATES PATENTS

| Number | Name | Date |
|---|---|---|
| 138,444 | Simmons | Apr. 29, 1873 |
| 348,280 | Kinkley | Aug. 31, 1886 |
| 543,757 | Stoner | July 30, 1895 |
| 640,458 | Farr | Jan. 2, 1900 |
| 1,248,178 | Sergeant | Nov. 27, 1917 |
| 1,679,445 | Peaver | Aug. 7, 1928 |